Dec. 15, 1964     J. J. HORAN     3,161,173
WATER CRAFT AND PROPULSION MEANS THEREFOR
Filed Dec. 31, 1962     7 Sheets-Sheet 4
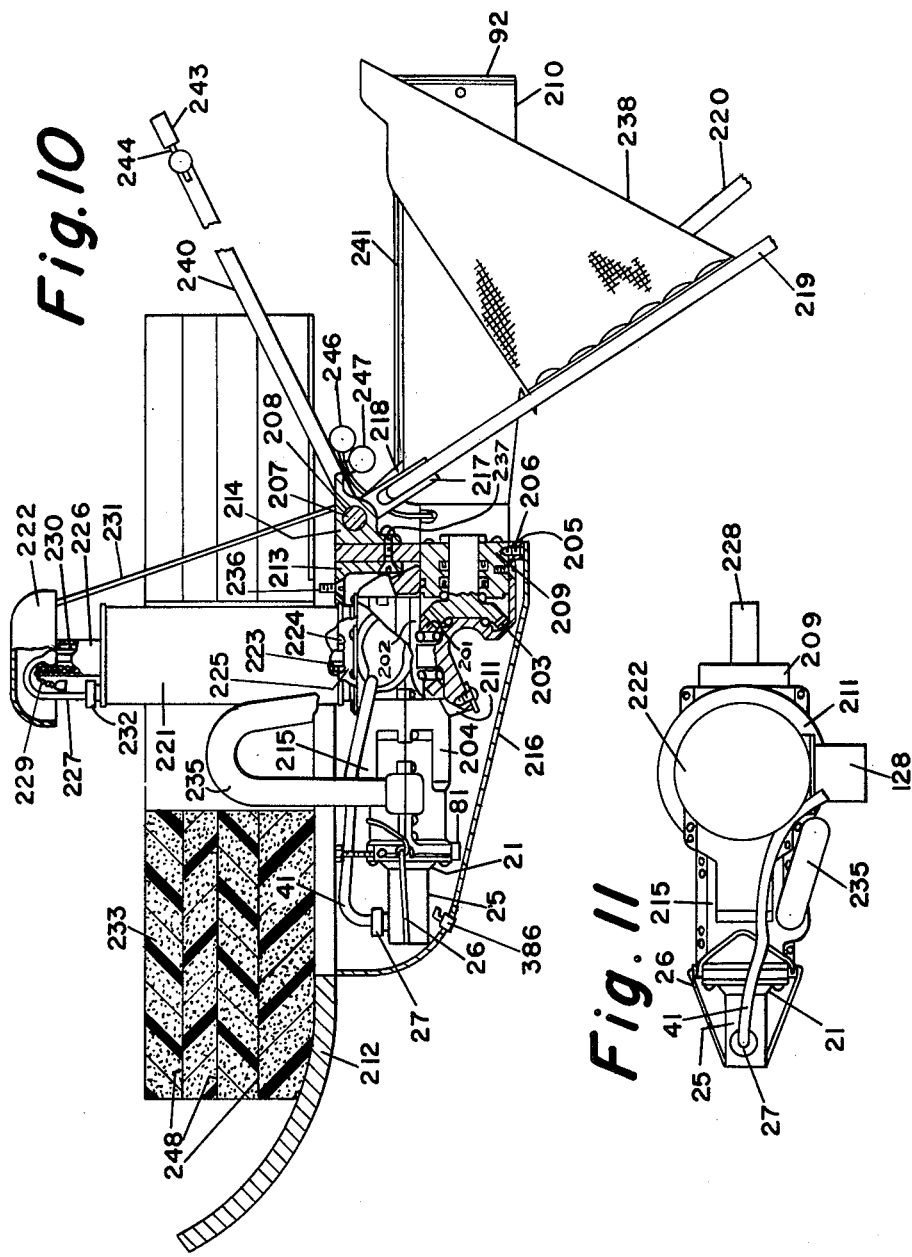

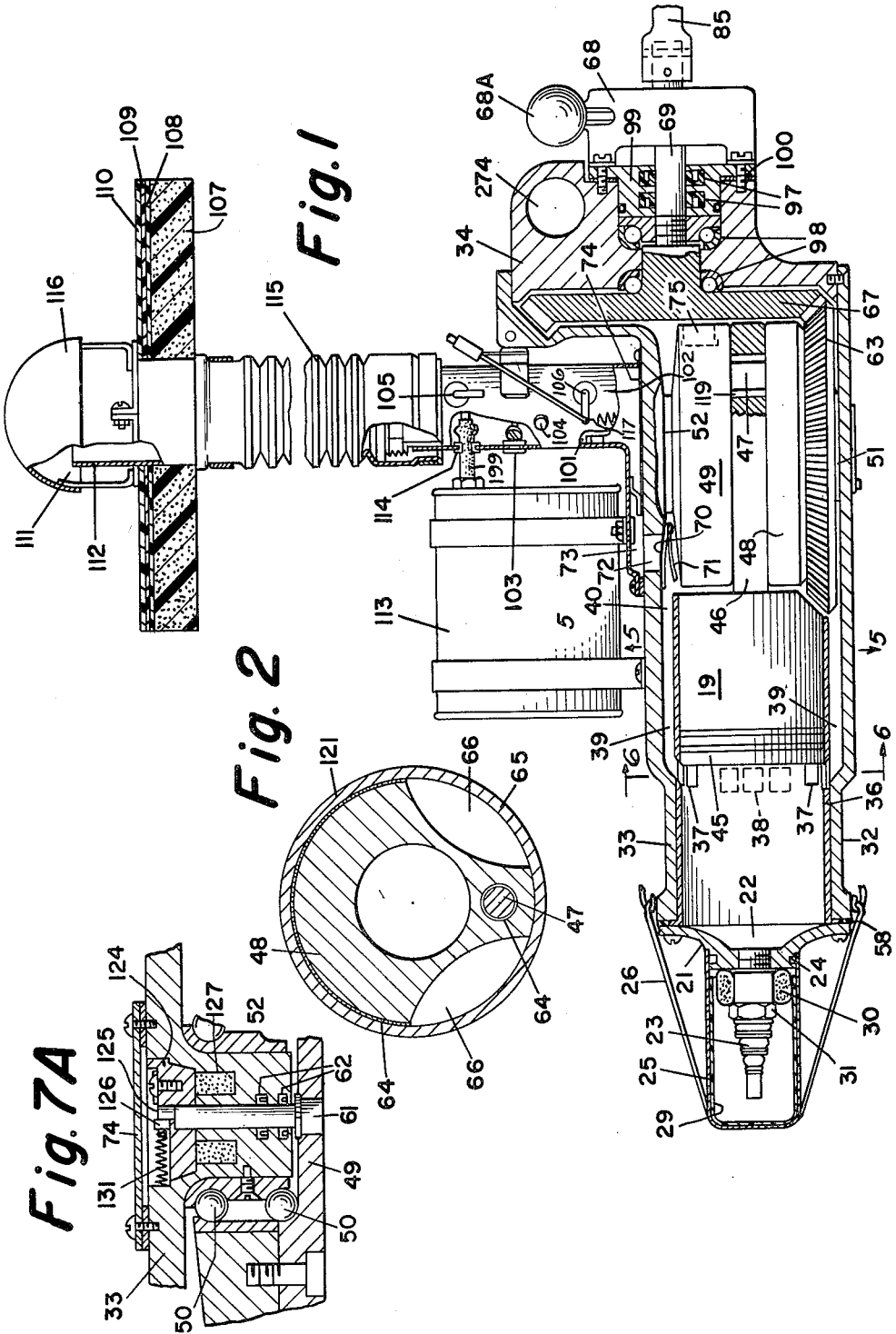

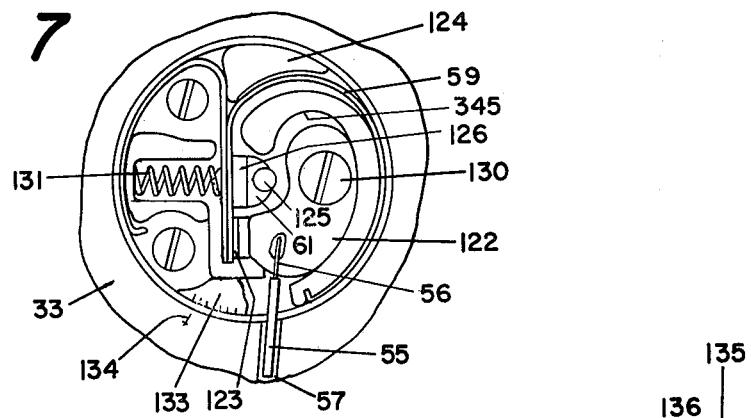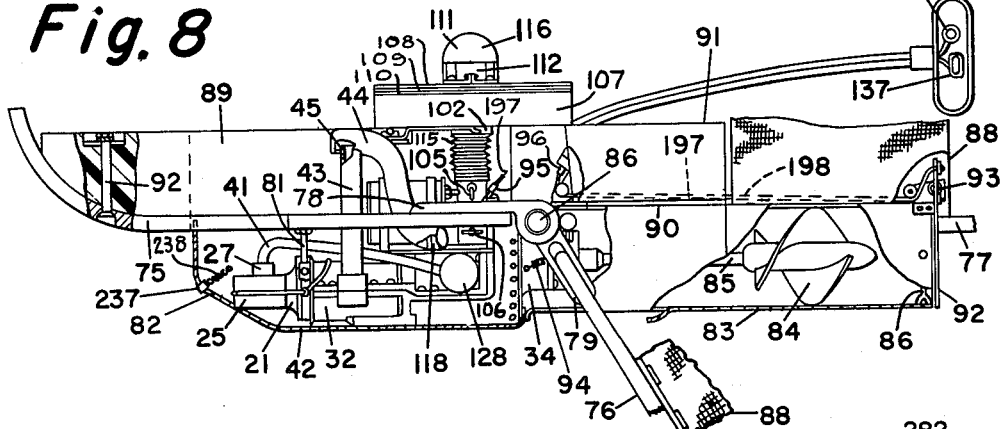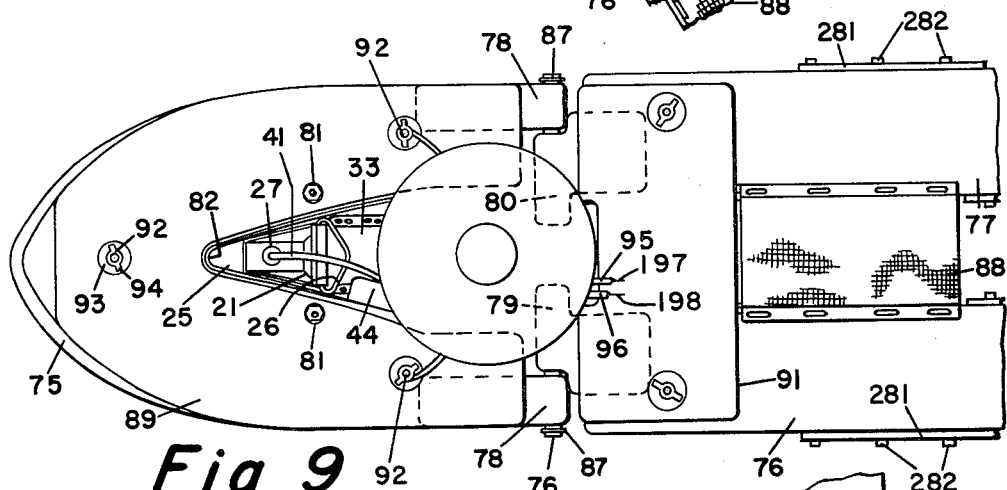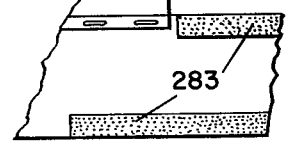

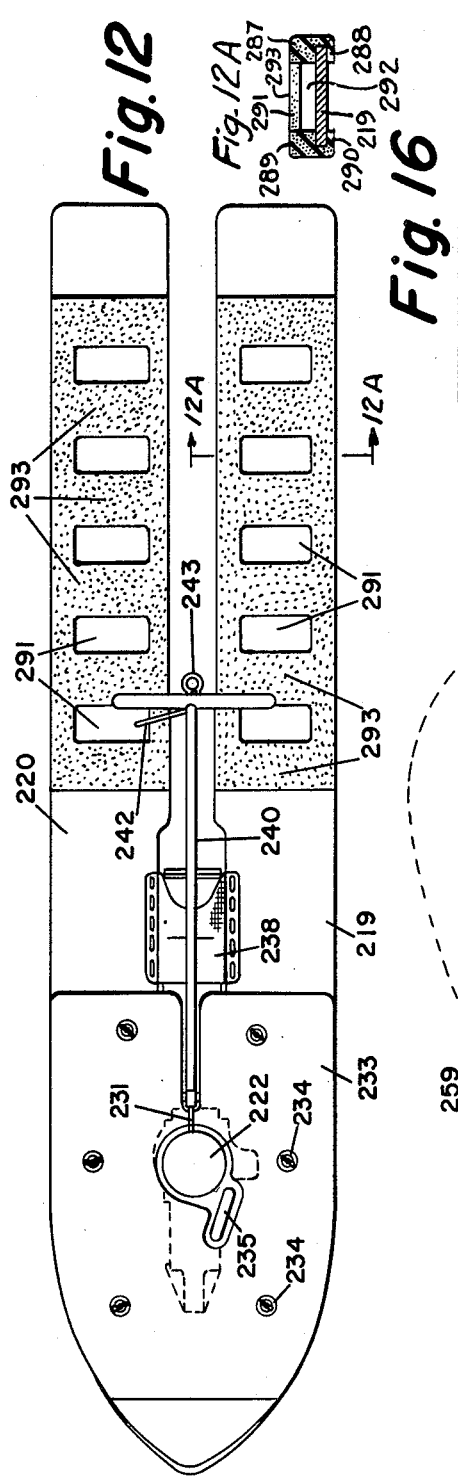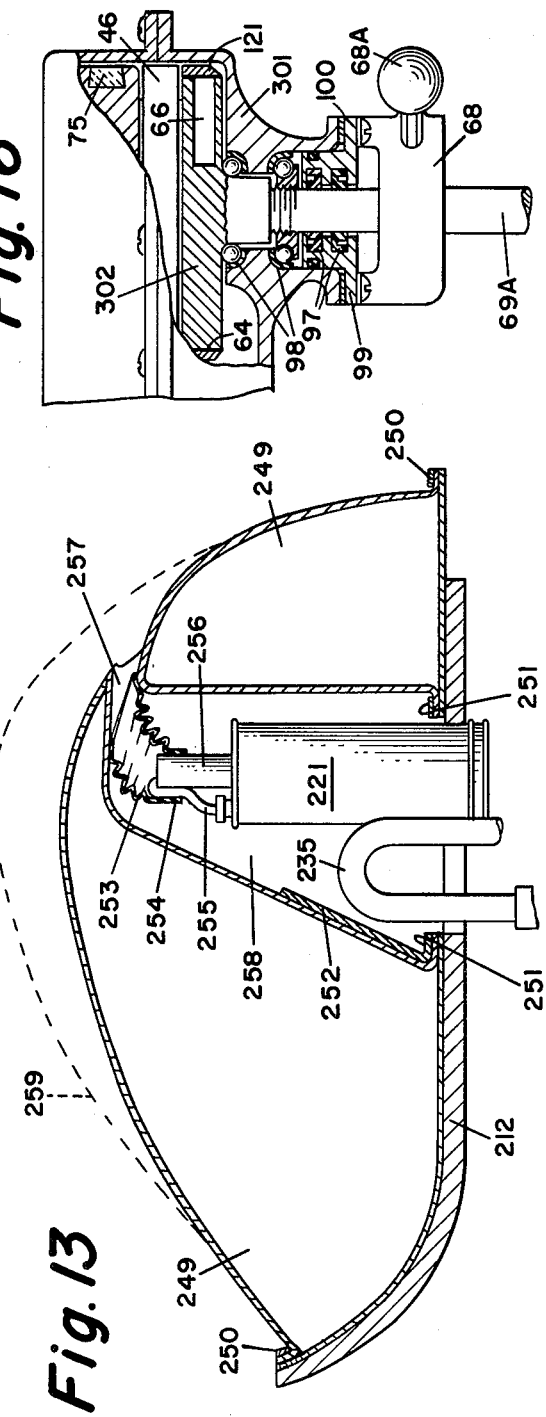

Dec. 15, 1964    J. J. HORAN    3,161,173
WATER CRAFT AND PROPULSION MEANS THEREFOR
Filed Dec. 31, 1962    7 Sheets-Sheet 6
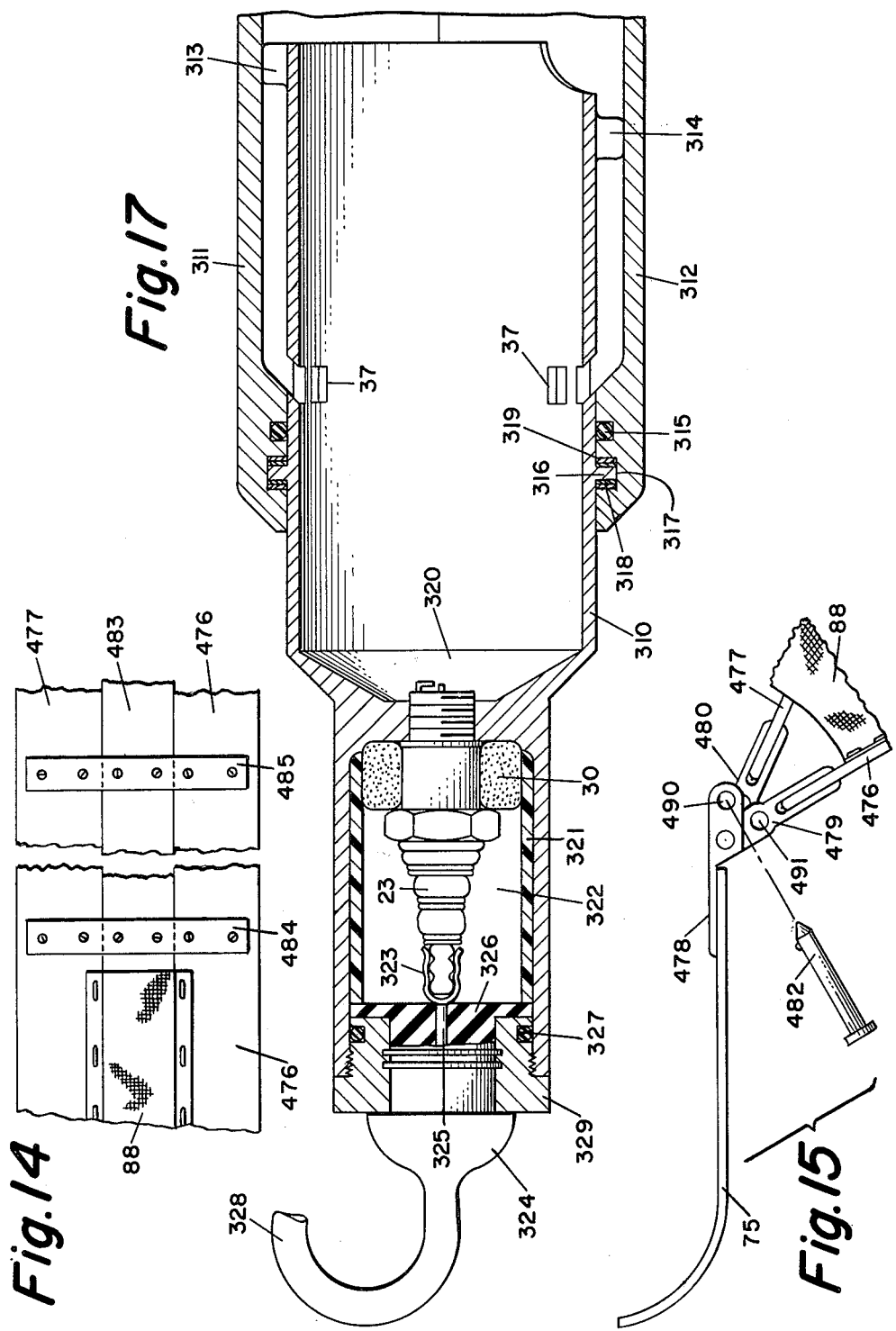

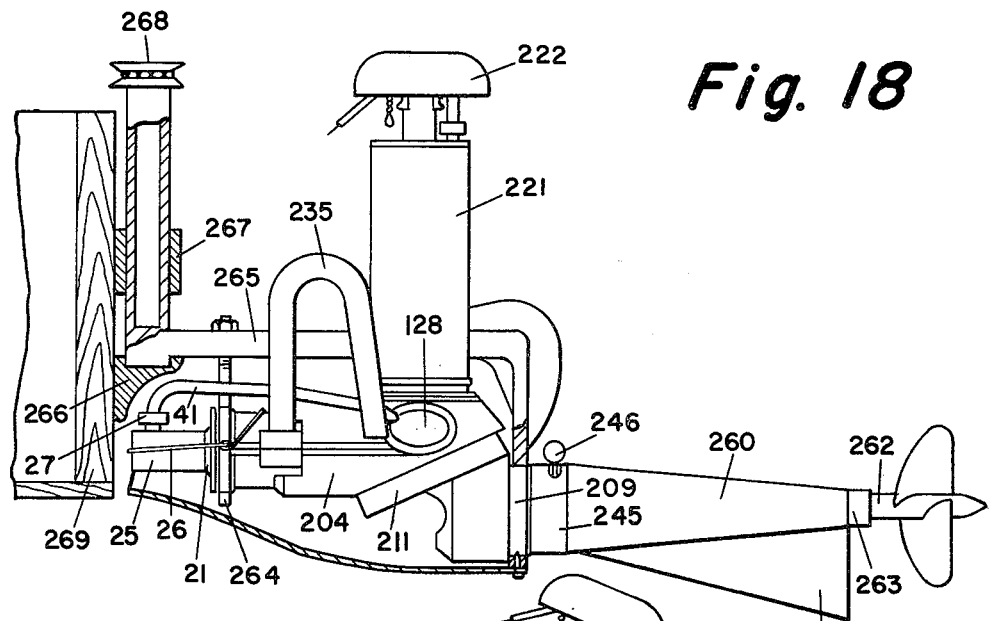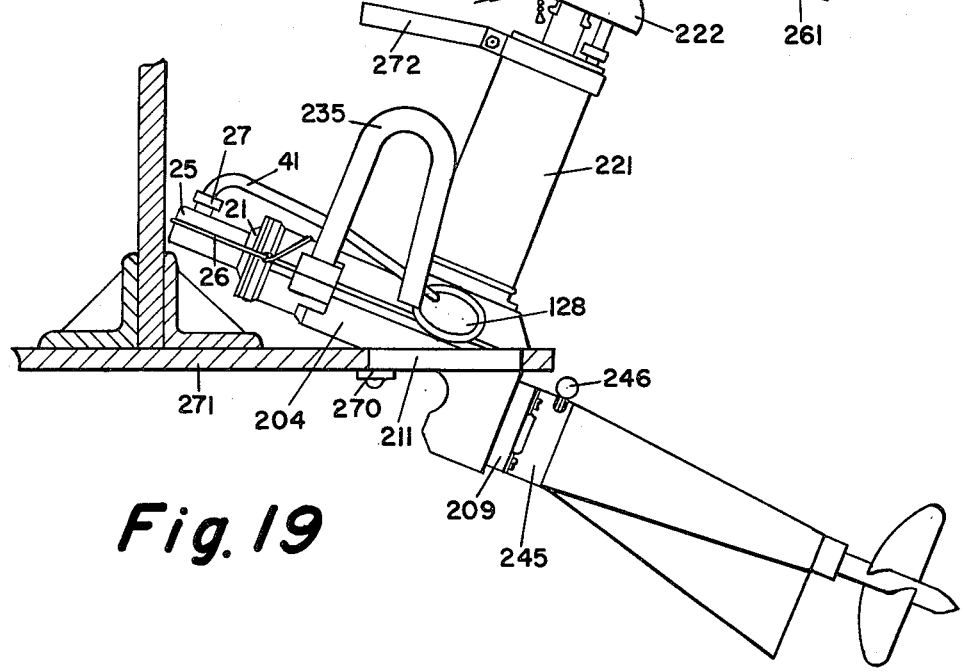

United States Patent Office 3,161,173
Patented Dec. 15, 1964

3,161,173
WATER CRAFT AND PROPULSION MEANS THEREFOR
John J. Horan, 420 Quigley Ave., Willow Grove, Pa.
Filed Dec. 31, 1962, Ser. No. 248,426
13 Claims. (Cl. 115—70)

This invention relates to self-powered water-planing devices.

Several devices have the general objective of providing water skiers with nontowing propulsion means. These devices have been generally characterized by one or more of the following disadvantageous attributes: bulky, cumbersome, heavy, top-heavy, difficult to maneuver, costly, etc. Often impracticable or scarcely functionable, they tend to turn turtle and drown their engines when the operator loses control or falls off.

For maximum value as a sport, the skier should exercise the maximum of control with the least effort; but the control should be immediate and direct; servo systems and power supplies would be out of place. The best way to achieve unity between the skier and his planing device is, first, to free him from the tow-line and, second, to reduce the number of components and the total weight and bulk of the apparatus to the absolute minimum.

The "Sea-Skimmer" water craft of this invention are inherently balanced by the strategic arrangement of the right kind and irreducible number of components in the most inherently stable array. The component designs are unique, the combination has no parallel, and the fact that the tidy concept is complete in a small number of small components yielding hot and agile performance emphasizes the points of distinction from the existing art.

Others have provided outrigger floats, large water-tight hulls that are true boats, broad based platforms, and other elaborate structures for conventional engine mounting and for prevention of capsizing, the sport being obscured in the shadow of the apparatus.

Top-heavy outboard engines cause skiing platforms to overturn when the skier engages in a tight maneuver or falls off. This not only terminates the excursion but requires immediate and expensive disassembly, purging of salt water, and possibly complete overhaul. Outriggers and broad platforms mitigate the instability only partly, at the cost of rendering the apparatus stiff, clumsy and slow to respond.

Inboard arrangements of land-type engines, of lawnmower and motorcycle types, are equally unsuited for the skiing environment.

The distinctive engines of this invention actually thrive and function best in an environment hostile to other types of small internal-combustion engines. Instead of measures to remove them from contact with water, even salt water, the engines of the "Sea-Skimmer" actually run with wet skins. They are located where, but for ordinary vulnerability, an engine for a skiing device ought to go, that is, below, where the small weight can not only be tolerated but actually employed to advantage.

In the "Sea-Skimmer," the engine, instead of being a creator of an overturning moment, actually furnishes a ballasting or stabilizing moment, thus affording inherent stability. Since the "Sea-Skimmer" resists overturning (other than deliberate, it being very small and light) it will withstand long periods of usage without contributing mishap to a skier's enjoyment.

An object of this invention is to provide an engine-equipped device for skiing, the device being of minimum size, weight, cost, complexity and upkeep, and at the same time affording maximum ease of balance, controllability, acceleration, speed, maneuverability, stability, safety, and other desirable aspects.

An object of this invention is to provide for use in said device and in other water craft of high performance and small size, an internal-combustion engine capable of withstanding operation as a prime mover while immersed in water without "drowning."

An object of this invention is to make it possible to achieve very high performance in extremely small water craft adapted to carry an operator or skier.

An object of this invention is to provide engines that include simple means for protecting them against water-immersion environments and of achieving power-weight and performance-weight ratios and attributes not otherwise achievable.

An object of this invention is to enhance the dynamic characteristics achievable with light-weight engines.

While a watercraft employing some of the inventive principles disclosed herein would be far superior to related devices even without these engines, the highest performance requires that the engine teachings also be adopted. Further objects and inventive features will become apparent in the balance of the specification, the claims and the drawings, in which:

FIG. 1 is a drawing, largely sectioned, of an engine for the "Sea-Skimmer";

FIG. 2 is a sectioned sketch showing the compensatory unbalancing of a crank member for the engine of FIG. 1;

Figure 3:
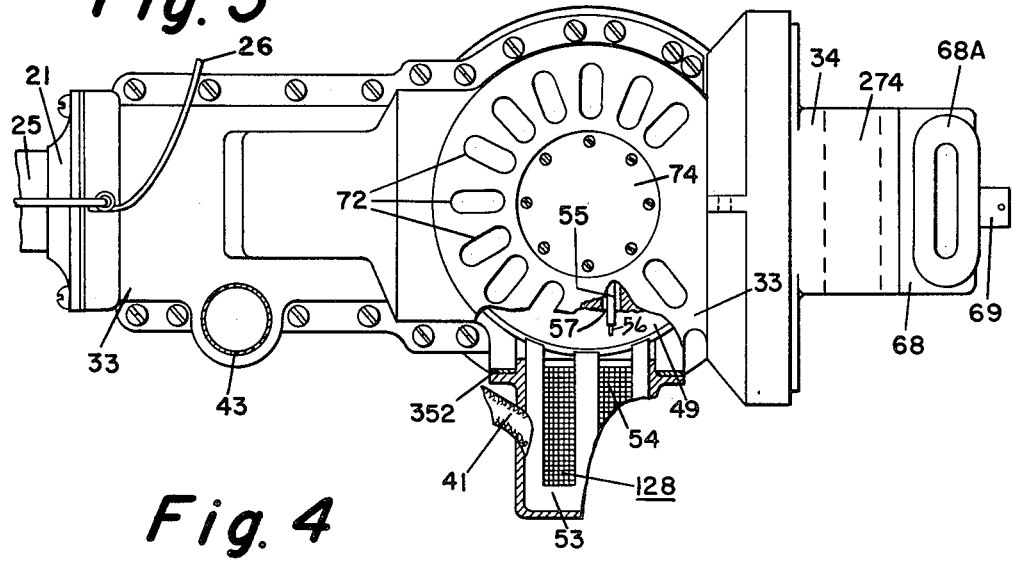
FIG. 3 is a partially sectioned view at a right angle to FIG. 1.
Figure 4:
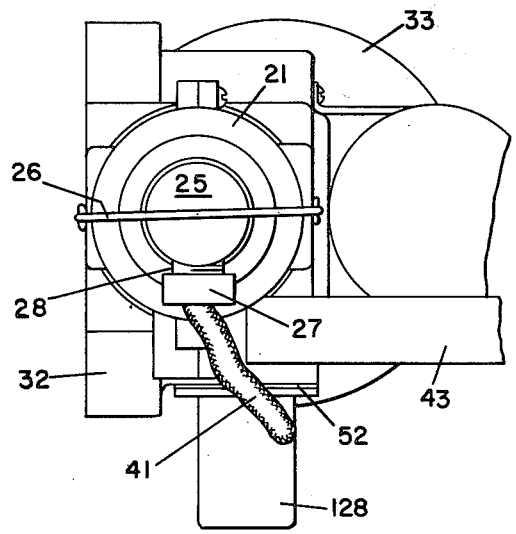
FIG. 4 is a view from beyond the cylinder head of the engine of FIGS. 1 to 3.
Figure 5:
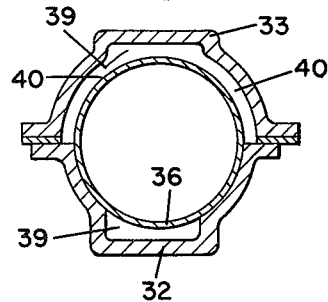
FIG. 5 is a fragmentary section showing surfaces cut by plane 5—5 of FIG. 1.

FIG. 7 views the spark gap zone of the engine of FIGS. 1 to 6;

FIG. 7A is a sectioned drawing of the spark-gap zone at a right angle to FIG. 7;

FIG. 8 is a cutaway view of the FIG. 1 engine installed in a "Sea-Skimmer";

FIG. 9 is a top view of the "Sea-Skimmer" of FIG. 8;

FIG. 9A is a fragmentary view of a portion of a skiboard, like that in FIG. 9, but with an alternate form of side thrust rail;

FIG. 10 is a cutaway view of a second engine installed in a second "Sea-Skimmer";

FIG. 11 is a view of the engine only of FIG. 10 from above;

FIG. 12 is a view from above of the "Sea-Skimmer" of FIG. 10;

FIG. 12A is a section through the skiboards of the "Sea-Skimmer" of FIG. 12;

FIG. 13 shows a form of flotation alternative to that shown in FIG. 10;

FIG. 14 shows a training modification of the "Sea-Skimmer";

FIG. 15 shows a second training modification of the "Sea-Skimmer";

FIG. 16 is a fragmentary view in partial section of a third form of engine;

FIG. 17 is a fragmentary view showing a modification of engine cylinder structure;

FIG. 18 is a view of one manner of installing the engine of FIG. 10 in a tiny passenger-carrying racing boat;

FIG. 19 is a view of another manner of installing the engine of FIG. 10 in a tiny racing craft.

Referring now generally to FIGS. 1 through 9 and particularly to FIGS. 1 through 7A, there is shown a unique form of small engine. To those familiar with the relatively bulky contours of lawnmower and outboard engines, the engine will appear starkly slim, simple, and uncluttered, and its power, based on overall cubage relative to known engines, may be underestimated. It is unusually long in proportion to its other dimensions, a characteristic that enhances its ability to yield maximum-speed performance while itself immersed in water.

While a 2-stroke cycle engine has been chosen for exemplification of principles, many of the inventive concepts are also applicable to 4-stroke engines.

The engine head 21, which includes a simple domed combustion chamber 22, carries a spark plug 23 and is equipped with a seal ring 24, to which a drawn cap 25 may be sealed and retained by a wire-type snap closure 26, slightly variant from a type used in home-canning of preserves. A water-tight fitting 27 leads the moisture-proofed high-tension wire 41 through the wall of the cap 25 via a threaded adapter 28. The cap 25 is lined with material 29 of minimum moisture absorption characteristic and high dielectric strength, such as "Teflon." A small ring-shaped bag 30, containing a dehydrated desiccant, is held in place under the wrench flats 31 of the spark plug 23.

The unique cylinder and porting arrangement reduces the number of components forming the outer wall of the engine, thereby eliminating joints, seams, and plugs, drilled and filed openings, and the necessity for sealing such items. Besides the head 21, the outer surfaces of the engine consist only of three other multi-function castings, the lower wall 32, the upper wall 33, and the end wall 34. The cylinder sleeve 36 is fitted between the lower wall 32 and the upper wall 33, held in place by its flange under head 21 and sealed with gasket 58. The casting arrangement and the partly self-supported sleeve 36 are adapted for high-production of maximum-effectiveness gas ports, without time-consuming hand-routing and filing, because these ports are fully defined as an early step in automated fabrication of the sleeve and because the gas passageways can be adequately defined in casting-sleeve clearances. The intake port groups 37, 37 are each a closely grouped set of punched oblong holes, seen in section in FIGS. 1 and 6.

Since the exhaust ports 38 cannot appear in the half of the engine exposed by the sectioning of FIG. 1, dotted rectangles 38 show the relative position these ports occupied in the cut-away portion of FIG. 1. The physical arrangement not only provides a breathing capability adequate for racing type engines, it also makes it unnecessary to hand-work the ports and, further, eliminates the need for applying sealing plugs, port covers, etc., in or on the cast walls 32, 33 to seal the usual paths of access for hand work. Such plugs, etc., would, of course, be especially undesirable in the environment for which the engine was invented.

The cast walls clear the self-supporting cylinder sleeve 36 below the intake ports 37, to provide well configured passageways 39, 39 which, porting through the cylinder walls, impart a desired upward velocity component to the gases issuing into the cylinder sleeve 36. The flow through the two longitudinal passageways 39, 39 tends to be equalized by the two large intercommunicating cross-passageways 40 between the wall castings 32, 33 and the outside walls at the skirt portion of the sleeve 36, which is completely self-supporting at this lower end.

Figure 6:
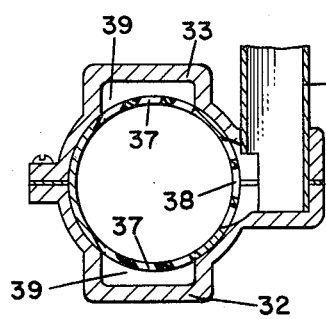
FIG. 6 is a cross section through the gas ports of the engine of FIGS. 1 to 5.

These gases also receive an inward velocity component as they issue into the cylinder 36, as best inferred from FIG. 6. The two inward-bound but upward-inclined gas streams collide along the left portion of the diameter, because of the asymmetrical arrangement of passageways 39 and intake ports 37. The flow resultant being upward, the scavenging action washes the spark-plug zone before excess fuel can be lost via the exhaust ports on the right of FIG. 6. The "loop porting" achieved by the simple construction shown applies the optimum principles of high-performance, racing-cylinder design to the flow of gases, without the very expensive hand-tailoring of the castings normally required. What is new here is not the fact of loop porting but rather the means of obtaining it.

The exhaust stack 43 is aimed vertically upward as the gases leave the cylinder. The stack 43, as seen in FIG. 8, terminates in cross-header 44, the lip 45 of which stack 43 extends upwardly inside the header 44 as a fence against the possibility of water washback through header 44. The lower end of header 44, which will usually be below water, is equipped with a light-weight, disc-type check valve 118, closable by both gravity and water-washback. The lightness of check valve 118 imposes the minimum of throttling of the escaping gases. The stack 43 and header 44, together, comprise a gas trap.

The two-ringed piston 19, its conventional wristpin and connecting rod 46, the latter being preferably equipped with needle bearings 119 at both ends, constitute the reciprocating components of this engine, which has no crankshaft. Piston force is transmitted by crankpin 47 to two rotating crank members, usually termed crankwheels in this specification because of the shape chosen 48, 49, though they need not be circular, as will be seen. Crankwheels 48, 49 ride, preferably aided by ball bearings 50, 50, on journaled surfaces herein designated as pintles 51, 52, respectively, pintles 51, 52 being preferably cast integrally with the respective lower and upper walls 32, 33. Crankpin 47 may be integral with one or both of the crankwheels or it may be braze-bonded (64 in FIG. 2) or otherwise secured to one or both crankwheels.

One or both crankwheels 48, 49 may be unbalanced by selective lightening, as seen in FIG. 2, affording far better smoothing action than when eccentric weights or flywheels are located and/or reacted anywhere other than immediately close to connecting rod 46. To compensate for the reciprocating masses of piston, wrist pin, connecting rod, and crankpin, the mass of the crankwheels is unbalanced so that the heavier region will be diametrically opposite crankpin 47. In FIG. 2, which shows one of several possible forms of construction, crankwheel 48 is shown in section, with slices 66, 66 milled out therefrom, following which operation, the crank pin 47 and the cover ring 121 have been inductively brazed into position, preferably with copper or silver foil interlayers 64, 64. The purpose of the cover ring 121 is to "stuff" the crankcase so as to produce higher crankcase pressures on the downstroke of the piston, as may be desirable for increasing injection pressure and, thus, high-speed torque. If more high-speed torque is not desired, ring 121 may be omitted and the crankwheel will be milled full-thickness at 66 and will no longer be wheel-shaped.

One crankwheel, conveniently 49, has two peripherally spaced magnets 75, 75, one of which is seen, as a dotted outline, in FIG. 1. The magnets are in peripherally matched relationship to function cooperatively with magneto assembly 128, best seen in section in FIG. 3.

Magneto assembly 128 has been screwed to upper wall 33, with gasket 352 interposed under its flange. Magneto assembly 128 is a potted assembly containing a stack 53 of E laminations, a coil 54 surrounding the middle leg of the E, and a condenser also potted thereinto but not seen in the drawing. The E lamination stack has its legs projecting through wall 33 to approach closely, within a few thousandths of an inch, to the surface of the spinning magnets on crankwheel 49. The approach can be closer than that of the conventional magneto stack to the conventional flywheel which, having a bearing to one side, suffers oscillating deflection of its shaft under high-speed operation and thus may rub a closely set magnet, destroying the magnet and perhaps the flywheel. Crankwheel 49, which itself is supported by and runs on pintle 52, will not oscillate in such a manner, thus it permits the magneto to be set closer, affording a richer, higher-voltage spark.

The magneto assembly 128, which is locally grounded, requires only two leads. One is the waterproofed, exposed, high-tension lead 41, already described. The other is the insulated 55 condenser lead 56 from the magneto assembly, which, as shown fragmentarily in FIGS. 3 and 7, feeds through a small hole 57, transversely drilled in the wall of upper casting 33, and is soldered to the insulated stationary point contact 122 of the spark gap system. The stationary point contact 122 is adjustable, as seen in FIG. 7, by loosening binding-head screw 130 and sliding the stationary point contact 122 in an arc against the restraining adjacent arcuate guide surface 345 molded into the top surface of the plastic retainer 124. The movable point contact 123 is assembled to double-leaf spring 59, which fits into plastic retainer 124. Spring 59 is actuated by the rotation against its cam bearing surface 126 of the eccentric upper end of cam pin 61, which fits in proper registry in a matching non-circular hole in crankwheel 49 and extends upwardly into pintle 52, past packings 62, 62, as seen in FIGS. 7 and 7A. The terminus of cam pin 61 is a small-diameter offset portion 125, which, once each revolution of crankwheel 49, forces spring 59 and, with it, contact 123 away from the normally closed position with respect to stationary point contact 122. Thus, the connection between contacts 122 and 123 is opened, causing a high potential to develop in the secondary of magneto coil 54 and fire the spark plug 23. Binding-head screws 132, 132, when loosened, afford limited freedom for rotating plastic retainer 124, so as to bring graduations 133 into desired registry with spark timing indicator 134, thus adjusting the spark timing. The spark-gap zone is closed by gasketed plate 74. Backup spring 131 reenforces spring 59 against the tendency to float at high speed and against resonance.

A second contact point assembly may be fitted into the lower pintle 51. Normally, only one of the two sets of contact points would be permitted to control the firing at any one time. The second set might serve either of two purposes. One would be to use it as a spare. Usually, however, one assembly would have an earlier setting, determined by the angular relationship between the end of the cam pin 61 fitted into crankwheel 48 or by manually setting an adjustment device, such as the retainer previously described. The purpose of the earlier setting would be to afford choice of earlier ignition when operating at very high r.p.m. Switching means, not shown, is necessary whenever more than one such spark-gap system is used. Each spark-gap cavity, like the spark-plug chamber, can be fitted with a tiny replaceable desiccant cartridge, such as the one shown at 127.

The crankwheel containing the magnet 75 will normally be made of non-magnetic material chiefly, such as aluminum alloy, high-tensile bronze, or non-magnetic stainless steel. Generally the selection of material will depend on evaluation of the comparative desirability of greatest freedom from vibration achieved by the better balancing that can be obtained with heavy-alloy crankwheels, versus faster acceleration with light-weight crank members.

The lower crankwheel 48 reacts most of the thrust of the connecting rod, which it transmits to bevel gear portion 63, which may be integral with the crankwheel or separately assembled. Separate assembly is shown in FIG. 1 because of the wider choice of gear cutting machines that can produce the toothed portion when separate.

Bevel gear portion 63 drives bevel gear 67. Any reasonable ratio is feasible between these gears; so it might, therefore, appear preferable to decrease the diameter of gear 67. In this instance the driven gear 67 was shown to be of equal diameter primarily in order to demonstrate capability of delivering top power from the engine, which has an extremely high r.p.m. capability, without excessively impairing the efficiency of the propeller, as might be the case if the high engine r.p.m. were multiplied to increase further the angular velocity of the propeller.

The only shaftway opening to the water is that provided for the rustless-alloy drive shaft 69, which is sealed by two glands 97, 97, facing both ways so as not to permit compression or fuel loss from the crankcase and, at the same time, to resist any influx of water along the shaftway during the upward stroke of the piston. Bearings are designed to sustain both thrust and radial loads; thus hardened races, as at 98, 98, are indicated wherever bearing balls might otherwise contact non-ferrous materials. End closure 99, containing oppositely faced glands 97, 97 for sealing shaft 69, permits adjustment of pressure and clearance of bearings by means of shims 100 under its flange.

The crankwheels, their arrangements and combinations in this invention afford significant advances in the small-engine art. Obviously, they eliminate the orthodox cross-crankshafting that normally would add to the hazard of leakage in and out and make it necessary to greatly widen the narrow engine. They make it unnecessary to add a conventional flywheel, which would also greatly widen the silhouette, as in conventional engines, and would cause undesirable spray to the annoyance of the skier and the greater hazard of drowning the engine via the air intake. By eliminating the flywheel, they eliminate the crankshaft flexure that normally accompanies its use and the couples that are usually caused by the separation of the flywheel from the cylinder axis. They actually constitute a very close coupled kinetic balancing means, affording maximum reduction of the moments normally incident between the connecting rod and the usually remote flywheel. When the crankwheel mass is deliberately made asymmetrical for balancing reciprocating forces, vibration is controlled by the fact that the crankwheel itself is part of its own bearing.

The close coupling of the crankwheel masses, besides easing the problem of vibration, is a source of both live and dead weight saving. The crankwheels constitute the shortest and the most rigid possible path between connecting rod and bearing; therefore, they make the most vibration-free path; and, when their masses are adjusted to counterbalance reciprocating forces, they are more efficient than prior devices. Moreover, some of the weight saved may be reinvested to secure an additional percentage of counterbalancing for still greater smoothness.

Fabricated from simple discs, slugs, or extrusions, the crankwheels eliminate the most costly single component in the usual engine, the crankshaft, which is expensive to forge or cast, to machine, to balance, and to inspect, the cost of the usual crankshaft climbing fast as the requirement for precision goes up.

Besides eliminating the crankshaft, its bearings and remote flywheel, the crankwheels permit still further slimming of the engine when the pintles on which they rotate are made to accept the spark-gap system. Still further slimming comes about because the crankwheels herein offer means for including the magnets, instead of relegating the entire electrical system to an outboard position beyond outlying crankshaft bearings. They indirectly contribute still more cooperatively to the slimming and simplification of the engine by virtue of the flat exterior surface that can be given to the coacting wall 33, which furnishes the pintle 52, thus enormously facilitating and simplifying the carburetor-manifold-reed installations, as shown herein.

The crankwheels may include gear functions, including bevel gear functions for orienting the driveshaft parallel to the piston axis, thus permitting full hydrodynamic advantage to be taken of the extraordinary slimness of the engine, when the head of the engine is oriented forward, the propeller in line and the fuel system upward, as will be seen. The crankwheels can be fabricated of light or heavy materials for any desired compromise between smoothness and fast acceleration; they can be made magnetic or non-magnetic at choice, with the two crankwheels being of different materials if desired.

The crankwheel inboard of the manifold can even incorporate a centrifugal supercharger if desired.

All advantages listed for crankwheels, except those reating to the fuel system, are equally applicable to four-stroke-cycle engines as well as two-stroke types.

The fuel-air intake system is a highly distinctive feature of the "Sea-Skimmer" and its engine. It is resistant to factors that normally drown engines brought accidentally into such intimate contact with water, the traditional enemy of internal-combustion engines. Beginning at the bottom of the stack 102 above the reed ports 72, 72, the manifold 73, gasketed 74 to the flat face of the upper wall 33, receives fuel-air mix from carburetor 101, which is fitted at the bottom inside the tall stack 102. The stack 102 has rubber-plugged access holes 103, 104 to carburetor adjustment screws. Choke and throttle keys 105, 106 slide in via rubber grommets to fit over the squared shaft ends of these two hidden butterfly valves.

Above the stack 102, there is fitted a bellows-like rubber hose 115 which ends in a breather float 116. The bottom of the breather float 116 has a slab of rigid plastic foam 107, sufficiently buoyant to stretch the hose 116 to its maximum length. The several thin upper layers 108, 109, 110 above the slab 107 are made of a soft resilient plastic foam that is capable of curling upwards against a wash of water and blocking it from entry below the bottom edge of the dome 111 of the float. The pipe 112 terminates the stack 102 within the dome 111 in a manner further to restrict any possible intake of water. Fuel tank 113 has a direct connection line 199 to the pulse chamber of the carburetor 101 via grommet 114. To kill the engine, this fuel line 199 may be pinched off or a fuel valve may be inserted in line 199 at this point.

When certain few components are assembled to the simple engine just described, the structure becomes the "Sea-Skimmer" concept. This structure, including the engine is seen in FIGS. 8 and 9. A single assembly shaft 86 is the key component for assembly. The large transverse hole 274 in the wall 34 of the engine accepts shaft 86, which is also linked to the forward planing board 75 via brackets 78, 78 and to left and right ski-boards 76, 77 via brackets 79, 80 respectively.

Where the brackets would otherwise be hidden in FIG. 9, they have been outlined by dotted lines. Brackets 79, 90 are identical, left and right selection being made by rotating the bracket end for end. Adjuster assembly 81, 81 fixes the pitch of the engine-propeller assembly versus the forward planing board. Cowling 82 serves as an optional means of further smoothing the contour of the slim assembly exposed to the relatively moving water. Plugs 237, which are removable, permit regulating the rate at which the cowling permits water to flow in and out. The engine will run warmer when the plugs are left in place. If it is desired to operate in salt water, while cooling the engine with fresh water, the plugs will all be secured and the fill level may be kept slightly higher than the stabilized exchange level. Chain 238 secures plug 237 to cowling 82.

Shroud 83 guards the propeller 84 and shaft 85, or, more properly, guards the skier against contact with these rapidly rotating parts. Terminal cross 86 is an X-shaped guard at the rear of the shroud 83 to prevent entry of any portion of a limb of the skier into the propeller zone.

The forward planing board 75 has a buoyant block 89, held in place by long screws 92, 92, washers 93, 93 and wing nuts 94, 94, set in shallow holes in buoyant block 89. The block 89 is made of one of the cellular foam plastics, such as foamed polystyrene or polyurethane. Plate 90 is mounted atop the forward end of shroud 83, the forward end of this generally cylindrical shroud 83 having a flat top. A second buoyant block 91 is mounted on this plate 90. Thus, it will be seen that, from the bottom to the top, there is an ideal (yet extraordinary in the skiing art) gradation of density of the component materials, all of which may be freely exposed to water. The dense compact engine and the drive train serve as ballast, much as the similarly positioned weighted keel would serve in a sailboat, where the overturning moment will be high also. The forward planing board 75 and the ski-boards, which are preferably made of wood, though they might well be of fiberglass with hollow midsection, are next in density, followed by the foam on top with its density of only 1½ to 5 pounds per cubic foot, the overall weight distribution being such that the structure has extreme stability against overturning. Replacing pieces 75, 76 and 77 with a one-piece cut-out board converts the "Sea-Skimmer" to a simple motorized sled.

While one might apply so much buoyant material that the structure could handle a tremendous overload of unskilled skier cargo with a great margin to spare, the purpose of the comparatively small amount of foam shown in the figures is, rather, to keep the "Sea-Skimmer" itself afloat and with the engine running reliably under any high-speed maneuver and after nearly all possible kinds of spills of the skier. The skier should be able to board it in deep water, where the usual buoyant ski-jacket will make it easier to mount.

The forward planing board 75 and the buoyancy material 89 have been cut out sufficiently in FIGS. 8 and 9 to permit raising the engine and cowling 82 to a higher level with respect to the forward planing board 75. Part of the upward displacement of the engine (or relative downward movement of the forward planing board 75) can be gained from adjuster 81. More space can be readily gained by inverting left and right brackets 78, 78 individually before again securing them to the forward planing board 75. The block of foam 91 above the shroud 83 would also require a clearance cut.

In general, the raising of the engine, cowling 82 and shroud 83, with respect to the forward planing board 75 results in a tradeoff. Speed goes up because the profile of the engine becomes less prominent in the water; and stability decreases as the center of mass of the engine moves up toward the center of buoyancy of the foamed plastic. The minimum turn radius is also increased by raising the engine.

Spring-loaded flapper valve 92 keeps the aft end of the shroud 83 blocked so as to prevent circulation of water therethrough and thereby keep the "Sea-Skimmer" from advancing in the water when it is unmanned and the engine is idling. The valve 92 can, therefore, be considered a "dead-man" control. At idling engine speeds, there is sufficient slip past the propeller 84 to keep the engine from stalling even with the flapper valve 92 closed, while, at the same time, insufficient thrust is developed to overcome torsion spring 93 that holds valve 92 closed.

In addition, a very slight retracting force, applied by low-rate spring 94, keeps one ski-board (in this case—76) slightly depressed when the "Sea-Skimmer" is unmanned, so that any possible movement will be in circles.

Still another "dead-man" control lies in the throttle spring 117, which restores the setting to "idle" when the "Sea-Skimmer" is not manned. The flexible cable sheaths 95, 96 are led together to grip control 135. The control cables 197, 198, which are within these sheaths, terminate respectively in control rings 136, 137. The skier, in the water, grasps the grip control 135, but does not immediately draw with his fingers on the rings 136, 137, that disable the "dead-man" controls. A single control might, alternatively, be substituted. It would first open the flapper valve 92 before it begins to affect the throttle 105.

Since the skier is somewhat buoyant, and the aft ends of the ski-boards 76, 77 are deeply depressed below the rest of the "Sea-Skimmer," the skier will not unduly depress the craft when he rests his feet against the ski-boards 76, 77, as he holds grip control 135. The forward planing board 75 tilts back somewhat; and buoyant blocks 89, 91 will be pulled somewhat downward; but unless the skier should deliberately try to drown the engine by forcing the stack below the surface, or by rolling the craft about its centerline, the engine will continue to run.

With his feet in place against the sharply tilted skiboards 76, 77, his body well down, and the buoyant blocks 89, 91 depressed somewhat, the skier draws with his fingers on rings 136, 137 that, respectively, open the flapper valve and the throttle 106. As the engine r.p.m. increases, forward motion may begin relatively slowly, the depressed skiboards 76, 77 exerting a high drag force. As the speed increases, the aft ends of the skiboards 76, 77 begin to rise. As they rise, drag lessens (the drag coefficient), and the engine r.p.m. increases further as the water velocity in shroud 83 continues to pick up. When the "hump" is passed, the skier is now planing. At this point, he may ease off the throttle control or keep it open, depending on whether he desires to hold his planing speed or increase it further. Should the skier fall off, the center of gravity of the "Sea-Skimmer" is so far below its center of buoyancy that it is not subject to overturning, as are all but the widest-based planing devices now in the art.

Between the independently articulated skiboards 76, 77 which rotate about pin 86 and which are held in place by snap rings 87, 87, there is a boot 88 of stiff fabric, which loops high over the shroud 83 and permits either skiboard 76, 77, or both, to be depressed at an extreme angle such as that of the skiboard 76 in FIG. 8. In FIG. 8, the boot 88 has been cut away to permit better portrayal of the propeller-shroud arrangement 83, 84, 85, 86. The purpose of the boot 88 is to protect the feet of the skier against accident during acceleration or turns. As the skiboards 76, 77 rise, the boot keeps his feet from being caught between either of the now-rising skiboards 76, 77 and the underside of the shroud 83.

It will be seen that this engine-propeller arrangement might have been reversed, that is, the engine might have been turned end for end, with its spark plug end being aft and the propeller forward. Any of several simple changes, such as reversing the direction of revolution of the engine or changing the pitch hand of the propeller, would convert the drive arrangement from the present pusher to a tractor.

Referring now to FIGS. 10, 11, 12, and 12A, there are seen an engine and a "Sea-Skimmer," both of broad concept similar to that just described. The engine embodies certain alternate drive and fuel-air handling structure.

As seen in FIG. 10, the bevel gear 201 is integral with or secured to the lower crankwheel 202 in a manner like that of the prior-described bevel gear 63, and it similarly drives bevel gear 203 at a right angle. In this instance, the drive centerline of gear 203 is displaced below the centerline of the engine. The engine is coupled to a shroud-shaft-propeller assembly 210, 84, 85 very similar to the prior embodiment. The shaft and propeller 84, 85 are not visible because shroud 210 has not been sectioned.

End block 209 projects aft from the end of the lower wall 204, enabling the engine to be coupled to adapter 205 by means of set screws 206 or other suitable fasteners.

In FIG. 11, the engine is seen alone from above. Like the prior-described engine, it appears unbelievably small. It may seem incredible that a dozen and more horsepower can be obtained from so slim an engine on the order of a foot long. Because of the basic efficiency of the slim configuration and nearly straight-line contour, from the spark plug cover 25 to the end of the shroud 210, the axis of which is parallel to the axis of the combustion cylinder, very little cowling is needed to afford the maximum efficiency of hydrodynamic flow past the power plant. For similar reasons, these engines are also highly adaptable to other uses, as will be seen.

Besides the end block 209, there are other surfaces available for mounting purposes. These include the angularly offset swivel base 211, set at an angle to the cylinder axis that suggests wide utility for boat-type employment, the forward end of the engine, of modified cylindrical shape, etc.

The exhaust stack embodiment is simpler than that previously described, being a simply inverted U-tube-type gas trap. For skiing applications with this engine the previously described exhaust stack 43, 44, 45 might be preferable.

The fuel system achieves the utmost in distinctive simplicity and protection. Virtually all that appear visible are a gas tank 221 and a dome 222. The gas tank 221 contains a hollow axial tube 226, open at both ends, in which the pulse-type carburetor 223 is fitted and secured with nut 224. The lower flange of the tank below this nut, therefore, constitutes the upper surface of the manifold 225, which fits nicely over the reed ports 72, located in the upper wall 215, which is also the lower surface of the manifold, the arrangement being similar to that of the prior engine in general. The tube 226 extends above the fuel tank 221, terminating within dome 222 for spray protection. The fuel-tank-to-carburetor hose 227 communicates, via the fuel tank filler cap 232, with a flexible tube that extends to the bottom of the tank 221. The fuel tank vent is of the orthodox type, contained in the cap 232. The spring-biased choke valve is operated by lifting its bead-chain control 229 and engaging it in any desired position in the notch at the top of the tube 226. The throttle control 230 is, as before, fed through a sheath 231.

The "Sea-Skimmer" of FIGS. 10 and 12 accepts the end block 209 in transverse bulkhead 205. The forward end of the engine is supported by adjuster assembly 81, identical with that seen in FIG. 8. Bulkhead 205, which closes the aft end of cowling 216, is secured to forward planing board 212 by angle brackets 213, 214 on each side of the fore-aft centerline of the "Sea-Skimmer." Left and right angle brackets 214 have a large transverse hole 208 serving functions similar to those of the hole 274 in end wall 34 in the prior embodiment. Left and right brackets 217, 218 for ski-boards 219, 220 pivot on pin 207 which traverses hole 208. However, as distinguished from related structure in the prior embodiment, the forward planing board itself does not pivot on the pin 207 or in the hole 208. Instead, the attachment for the bulkhead 205 and the forward planing board 212 is effected by angle brackets 213, 214 via bolts and screw fasteners, including 236, 237.

Pan 216 is sealed against entry of salt water (optionally) by valve 386, when filled initially with fresh water. Replenishment may be made with salt water, the valve being generally left at least partly open when in fresh water.

A large buoyant block 233, which optionally may be made up of layers, as indicated by the numeral 248, is held in place on the forward planing board 212 by six wing nuts 234, 234 installed in the same manner as were wing nuts 94 in the prior version. The buoyant block 233 is cut out to clear gasoline tank 221 and exhaust stack 235.

As in the prior embodiment, the engine is again pictured in the lowest and best position insofar as stability of the craft is concerned. This time the foam plastics above the engine might appear to bar the adjuster 81 or a conventional fixed bracket from raising the engine higher. The foam plastic may, however, be easily cut or cheaply replaced, particularly in view of its layered configuration. Moreover, it will be observed that brackets other than 213, 214 might have been substituted to position the engine even higher, say, if desired, even above forward planing board 212. Such elevation of the engine, while possible, is not to be preferred, even though the stability would still be far superior to that of craft employing outboard engines.

It will be noted that the propeller shaft is well below the centerline of the engine cylinder. This gives a step construction that permits the engine to ride higher than does the propeller. It will also be seen that gears 201, 203 are smaller than those in the prior embodiment. Therefore, especially when the engine is tilted with respect to the forward planing board, flatter bottomed, smaller cowlings may be substituted for cowling 216, with some trade-off of stability and ability to turn and corner the craft in favor of straightaway speed and planing ability.

Again, as in the prior embodiment, pin 207 is the point of pivot-coupling of the skiboards 219, 220, which extends aft to make up most of the length of the "Sea-Skimmer." Again, a fabric boot 238 serves as a protector for the feet of the skier; cross 86 protects him against entry of a limb into the shroud 210; and flapper valve 92, spring-loaded, prevents advance of an unmanned "Sea-Skimmer" when the engine is idling. Cross 86 is not seen because shroud 210 has not been sectioned.

Ski-boards 219, 220 are shown without conventional types of foot bindings because of a fundamental difference between towed skis and the "Sea-Skimmer." When on towed skis, the skier himself, by body stress, must deliver all of the towing thrust via his feet to move the skis through the water. Without bindings, he may be pulled forward, right off the skis. In the "Sea-Skimmer," on the other hand, the forward thrust is delivered directly by the engine to the skiing device, the task of the skier not being compounded by any need to deliver thrust. His effort will be limited to keeping balance and delivering control impulses, via feet and hand control, as well as the throttle, as he shifts his body to perform maneuvers. Foot impulses need not be limited to the restricted zone afforded by bindings; but bindings may be used if desired. Lacking a requirement to deliver thrust, and operating a device that is so light and small, compared to his own weight, the skier may perform more complex, swift, and spectacular maneuvers for a longer time without self-tiring.

Referring particularly to FIGS. 12 and 12A, and momentarily back to FIGS. 9 and 9A, it may be seen that the edges of the skiboards are equipped with thrust rails. As seen in FIG. 9, thrust rails 281 actually serve several purposes, one of which is to permit the skier to deliver side thrust, as he would want to do, for example, when shifting his weight to the inboard ski to execute a turn.

Thrust rail 281 is an elongated strip, attached by fasteners 282, which protrude in the drawing but are preferably flush or recessed, along the edges of ski-boards 76 and 77, and extending well above the top surface of the ski-boards. Thrust rail 281 could be of wood or other solid material; but for protection against abrasions during spills it is preferably of rubber, thick and stiff enough to accept some thrust between adjacent fasteners 282.

In FIG. 9A, thrust rails 283 lie along the edges but on top of rather than against the sides of ski-board 76. They are adhesively attached. They are preferably of open-cell foam of such character that they will be resilient without excessive tendency to hold water. Adequately springy, such material affords optimum protection against skin abrasion during spills.

In FIG. 12, ski-boards 219 and 220 have thrust-rail means that affords still more protection against skin abrasion and at the same time enhances controllability of the craft. The material 287, 289 of the thrust rail, similar in character to that of thrust rails 283, carries all the way 288, 290 around the edges of skiboards 219 and 220, as detailed in FIG. 12A, helping further to minimize the possibility of bumps and bruises.

Moreover, between the cutouts 291 that are seen at spaced intervals in FIG. 12, there are bridges 293 of the same material connecting the left and right thrust rails on a ski-board and making the rail means one-piece. In FIG. 12A, these bridges 293 are seen to be elevated above the surface of ski-board 219. Thus, it may be seen that the skier can slip his foot at will into or out of any of the cutouts 291 in the soft foam material of the thrust rail means, poising either foot aft or forward, as may be desired, for executing a maneuver. He will not lose a ski that someone will need to recover, either. He still retains the advantages of the previously described thrust rails, while preserving assurance that, even while turning rapidly in chop severe enough to raise his foot momentarily from the ski-board, the foot will return to the board without spill or injury.

T-control arm 240, also pivoted on pin 207, affords a rigid, hand-operated balancing control, as contrasted with the flexible device 95, 96, 135, 136, 137 used in the prior embodiment. Like the other arrangement, it affords a means for leading throttle control 230 (seen in FIG. 10) via its sheath 231, and the flapper valve control cable 241 to a common point within T-control arm 240, so as to permit use of a single spring-biased "dead-man" type of finger control 242, as seen in FIG. 12. A spring-biased control-arm lock, by means of which the T-control arm may be clamped or pinned to shaft 207, is operated by withdrawing ring 243 slightly and rotating it 90°, so that pin 244 no longer finds support against the crossbar of the T-control arm. The T-control arm is more effective in delivering moments to the "Sea-Skimmer" than is the flexible control cable. This will not always render it preferable for all purposes.

Starter mechanism 245, like the prior one, is coupled between the engine and the propeller shroud 210. Because of lack of clearance here for the skier's arm, the rope handle 246 is led over sheave 247 and under T-control arm 240.

The full-length plan view of the "Sea-Skimmer" in FIG. 12 affords striking contrast with the cumbersome prior art. Looking straight down, all that can be seen of the tiny engine below are the dome 222, the top surface of the exhaust stack 235, and the throttle control cable sheath 231. The dotted lines show the small extent to which the tiny engine underneath exceeds the outline of the cutouts made in the buoyancy block 233 for clearance of the dome and stack.

Remembering that a typical size for non-professional, general-purpose, towed water skis might be 6 feet long and 7 inches wide, with some versions, such as "Big Boy," going to 9 feet, it is seen that the "Sea Skimmer," with its overall length of 6 to 6½ feet and ski-board width of 7 inches, with spacing between the ski boards being typically 5 inches or so, is comparable in size and may often be shorter than unpowered, towed skis. With more than adequte power available from engines ranging from 10 to 20 pounds gross weight, the "Sea Skimmer" pays only a tiny weight penalty for self-power, for the complete freedom from towing, and the unique capability of making fully coordinated maneuvers and movements on split-second, one-man decision.

When it is further realized that the depth of the "Sea-Skimmer," as shown in FIG. 10, is so shallow, its usefulness in waters that will not admit boats will be better understood. Remembering also that the depth of the foamed plastic buoyancy block 233 may be selected 248 and changed at will by loosening the wing nuts, to suit the capability and weight of the skier or the roughness of the water, and that ski-boards 219, 220 can be simply swapped by the loosening of a pin 207 for boards of different lengths, or widths, that the overall width of the craft may be personalized by the substitution, for example, of a longer pin 207, further realization will be inferred as to the brand-new dynamic intimacy of personalization with which the skier can readily endow his use of the versatile "Sea-Skimmer."

Referring now to FIG. 13, there is shown a forward planing board 212 similar to that seen in FIG. 10. An air cell 249 is mounted on the board 212. The air cell 249 is preferably of synthetic rubber, held down on forward planing board 212 by strip 250, 250, which bounds its outer periphery, and by strip 251, 251, around the tubular clearance channel 258 provided in the cell 249 for gas tank 221 and exhaust stack 235. An extension 252 on strip 251 prevents the wall of cell 249 from contacting exhaust stack 235.

Clearance channel 258 takes a right-angled turn aft near its upper end terminating in air-entry 257, angled aft.

A stretchable hose 253 is secured to the wall of air entry 257 and extends forward to air intake tube 256, which it grips with elastic cuff 254. A seal might be applied at 254; however, for this embodiment the cuff need not be water-tight, it being preferred that any water splashed into air entry 257 drain down outer wall of fuel tank 221.

The design and employment of air cell 249 imparts to it a unique characteristic. Any force tending to submerge air cell 249 results in its being squeezed laterally inward by water pressure, which, of course, acts most strongly towards the bottom. Thus, the upper surface of air cell 249 is bulged further upward toward and perhaps beyond dotted outline 259. Hose 253 then stretches to keep air intake 256 linked with air entry 257, automatically compensating in part for the submergence and helping to keep carburetor and moving parts of the engine dry.

Referring now to FIG. 14, ski-boards 476, 477, otherwise identical with ski-boards 76, 77 in FIG. 9, are connected, together with middle board 483, to form a single plane surface. Straps 484, 485 are bolted in place across the three boards 476, 477, and 483. Quick-disconnect arrangements or other devices may be substituted for straps 484, 485. Use of this removable modification permits the "Sea-Skimmer," while retaining most of its distinctive advantages, to be operated like a hinged power-surf-board, a mode that is helpful for beginners.

In FIG. 15, which represents a further variation on a portion of the structure of FIGS. 8 and 9, bracket 478 is attached to forward planing board 75 in the same manner as were left and right brackets 78, 78, described therewith. Left-hand bracket 478, however, will be seen to be extended and to have a second transverse hole 490 behind the first. Bracket 479, replacing bracket 79 of the earlier figure, will also be longer and have a second transverse hole 491. Bracket 480, replacing bracket 80, also has a second hole, as does the right-hand bracket 478, which is hidden in this view. Lock pin 482 is interchangeable for use in the new holes on either side. When fitted through holes 490 and 491, it will align left ski-board 476 as an extension of forward planing board 75. A second lock pin 482 will similarly lock right ski-board 477 as a parallel extension of forward planing board 75. Boot 88 can then be dispensed with. Thus, the structure may be converted at any time from articulated, separately balanced skis to skis that are held rigidly in the same plane with the forward planing board 75.

Use of the middleboard 483, described with FIG. 14, together with the brackets, as modified in FIG. 15, converts the whole craft into an unarticulated motorized surfboard, of function similar to that mentioned in column 8, lines 7–10, except that it can be converted back to the most agile mode by simply removing the parts added, that is, the middle board 483, straps 484, 485 and the lock pins 482.

Referring now to FIG. 16, the engine shown will accept most of the components described in connection with other figures, differing only in its right-angle drive, that exits via lower casting 301 but otherwise is arranged and functions identically with corresponding components in prior figures.

Referring now specifically to FIG. 17, there is seen a structural variation applicable to all engines of this invention. It embodies several distinctive characteristics. The cylinder sleeve 310, shown in section, with no piston in place, combines functions of a number of parts of the engines previously described. The cylinder 310 is exposed directly to cooling by water, the upper casting 311 and the lower casting 312 terminating just forward of the valve area.

Cylinder 310 has bosses such as 313, 314 for holding its alignment with the walls in the ported areas of the upper and lower castings 311 and 312. A seal against influx of sea water and against pressure loss in the crankcase and port regions is provided by O-ring 315. Inlet ports 37, 37 perform functions identically with those so numbered in FIG. 1.

Cylinder 310 is prevented from moving longitudinally with respect to upper and lower castings by its flange 316, which engirdles it. Flange 316 does not fit recess 317 longitudinally, the adjacent spaces on both sides of the flange 316 being snugly filled with shims 318, 319. A shift of any shim from one side of flange 316 to the other will change the compression ratio of the engine because the piston travel is fixed by the crankcase projections; so movement of the shims changes the effective height of the combustion chamber 320.

Spark plug 23 and desiccant ring 30 perform the same functions as did similar parts in FIG. 1. Spark plug chamber liner 321 has high dielectric strength and minimum moisture absorption. Spark plug chamber wall 322 is integral with cylinder 310 and the cylinder head.

A spring finger 323 grips the tip of spark plug 23 when high-tension, molded, sealing plug 324 is screwed into chamber 322. Sealing plug 324 consists of a high-tension wire 325, an integrally molded rubber insulator 326, a threaded metallic adapter 329, which screws into the threads at the forward end of chamber 322 and is sealed by O-ring 327. The cable 328 is normally reverse-twisted to the left a few turns before it is screwed into place to close the mouth of chamber 322.

Referring now to FIG. 18, there is shown a scheme for employing the engines of this invention generally, and particularly the engine of FIGS. 10, 11, and 12, to drive a newly envisioned class of very light-weight, low-draft, highly maneuverable, very small racing craft. For non-skiing use, except when the water is only a foot or so deep, is may be desirable to remove the shroud arrangement and replace it with the boom 260 and skag 261. The propeller shaft 262 rides in a water-lubricated bearing 263 at the end of the boom 260. The end block 209 is again the mounting point on the engine, with forward clamp 264, like 81 in the ski version, positioning the forward end of the engine. The Z-shaped engine suspension 265 pivots at its forward end in pedestal 266 and ring 267; and it terminates in steering sprocket, driven by a chain (not shown) by a prone operator forward of the transom 269.

Referring now to FIG. 19, the engine of FIGS. 10, 11, and 12 is mounted, by its obliquely set swivel-base ring seat 211, which is cast integrally into lower wall 204. Several screwed-on fingers 270, only one of which is shown, are distributed around the undersurface of ring-seat 211 to hold it down while leaving it free to rotate. The engine may be installed in this manner aft of a transom, as in FIG. 18, or in the bottom 271 of any non-watertight compartment or outboard shelf at bottom level. For use in very small, high-performance, light, shallow, agile, planing water craft, it may be steered by clamped-on tiller 272 or other means. Reversing is accomplished by rotating the engine 180°.

Besides their use in water-racing craft, the tiny, high-performance engines may also have capability and applicability of individually manned midget craft for military amphibious operations, because of the low silhouette, high speed, and agility that combine to make such craft difficult targets, and because they may be adapted to run right up the beach.

It will be obvious that various combinations can be made of inventive features I have shown. Such combinations will become immediately obvious to those skilled in the art without departing from the true scope of this invention. It is most obvious that major improvements over the old art can be accomplished by the adoption of only portions of the inventive features disclosed hereinabove. New equivalents of the embodiments introduced and taught here will immediately suggest themselves. It is, accordingly, intended to include in the appended claims such portions and equivalents as may fall within the true scope of my invention. I wish it to be understood that my invention is not to be limited to the specific forms or arrangements to which I have limited my descriptions, drawings and claims for the sake of brevity and expeditious prosecution, therefore, I claim:

1. A watercraft having a fore-to-aft centerline and comprising:
an internal combustion engine located at the bottom level thereof along said centerline;
a generally horizontal output power shaft extending from said engine along said centerline;
a screw propeller mounted on said shaft;
an elongated water planing platform structure extending forward and aft of said engine,
said engine being mounted upon said structure and depending at least in part below said structure and below the water level of said craft,
said engine being immersed in water for cooling itself and ballasting said craft;
and a buoyant element surmounting said platform structure.

2. A water craft as in claim 1,
the width of the depending part of said engine being less than half the width of said platform structure.

3. A water craft as in claim 1,
said craft having external housing means guarding said propeller,
said housing means being proportioned to exclude the digits and limbs of a falling human operator from access to the zone of revolution of said propeller.

4. A water craft as in claim 1,
said platform being composed of a forward portion and an aft portion,
said portions being linked by pivot means.

5. A water craft as in claim 4,
said aft portion consisting of separate right and left skiboards disposed on opposite sides of said centerline,
each of said skiboards being linked to said forward portion by pivot means,
whereby said right skiboard and said left skiboard may be independently depressed.

6. A water craft having a fore-to-aft centerline and comprising:
a structure having a hydroplaning undersurface;
an underboard propulsion system mounted to said structure and longitudinally aligned with and along said centerline,
said propulsion system in turn consisting of
an immersion-cooled internal-combustion engine depending at least in part below said undersurface,
a generally horizontal shaft extending from said engine along said centerline and a propeller mounted on said shaft;
buoyancy means surmounting said structure;
and air-intake means and control means communicating from above said engine downwardly thereinto,
whereby said engine also constitutes a stabilizing keelwise ballast for said craft and exerts a righting moment upon said craft, even at very large angles of roll thereof.

7. A water craft as in claim 1,
said craft having a contoured cowling about said engine for confining water thereagainst,
and closure means in said cowling for regulating the admission thereinto of water upon which said craft is cruising,
said closure means being adapted to be closed against direct access thereinto of such water,
whereby said cowling may optionally be pre-loaded with fresh water when said craft is about to cruise on salt water.

8. A water craft as in claim 1,
said engine having an air-intake system located thereabove,
said system including an entry port at the top thereof,
said system having a buoyant element attached thereto near said port,
the center of buoyancy of said buoyant element being situated at a level below the level of said port,
said system including elastic conduit means below said port,
whereby, when said engine is subjected to plunging excursions during travel over water having a disturbed surface, the said entry port is lifted by said element and enabled to remain above water.

9. A water craft as in claim 3,
said housing means having a water-circulation blocking device movably attached thereto,
said device being biased in blocking position by spring means,
said water craft having operator-control means coupled to said blocking device for overcoming said spring means,
whereby passage of water through said housing means is restricted whenever the operator of said craft is not intentionally controlling said operator-control means to overcome said spring means and hold said blocking device out of blocking position, and the craft can not accidentally run away.

10. A water craft as in claim 5,
said water craft having a comparatively weak spring means coupled between one of said ski-boards and other structure forming a part of said craft,
the line of action of said spring means having been chosen so that a rotating moment is applied to said ski-board by said spring means,
said rotating moment being of sufficient magnitude to cause said ski-board, when no operator is aboard, to assume an attitude different from that of the other of said pair of ski-boards,
whereby, when the engine is running with no operator aboard, the asymmetry caused by the said different attitude will limit said craft to movement on a circular course.

11. A water craft as in claim 5, including
flexible guard means attached to the inboard sides of said ski-boards generally abreast of said tubular housing means,
said flexible guard means being of sufficient length to permit said skiboards to be greatly depressed without hindrance therefrom,
whereby said guard means will not impair the functioning of said craft as a water vehicle and will repel either of the feet of the skier from being caught between said housing means and one of said ski-boards.

12. A water craft as in claim 5,
each of said ski-boards having a raised margin along the sides thereof,
whereby transverse thrust can be imparted to said skiboards by the feet of the operator thereof.

13. A water craft as in claim 12,
the said margins along the sides of each ski-board being cross-connected at intervals along the length thereof by bridges of flexible material.

References Cited in the file of this patent
UNITED STATES PATENTS

| | | |
|---|---|---|
| 1,052,763 | Stone | Feb. 11, 1913 |
| 2,058,350 | Petter | Oct. 20, 1936 |
| 2,089,366 | Hansen | Aug. 10, 1937 |
| 2,333,419 | Fitch | Nov. 2, 1943 |
| 2,404,833 | Forster | July 30, 1946 |
| 2,434,700 | Keckley | Jan. 20, 1948 |
| 2,739,581 | Garrett | Mar. 27, 1956 |
| 2,969,037 | Vogt | Jan. 24, 1961 |
| 3,036,544 | Magri | May 29, 1962 |

FOREIGN PATENTS

| | | |
|---|---|---|
| 822,466 | France | May 31, 1937 |
| 1,141,185 | France | Mar. 11, 1957 |